July 21, 1931.   J. JAMIESON   1,815,736
APPARATUS FOR CUTTING METAL AND OTHER MATERIALS
Filed July 18, 1928   2 Sheets-Sheet 1
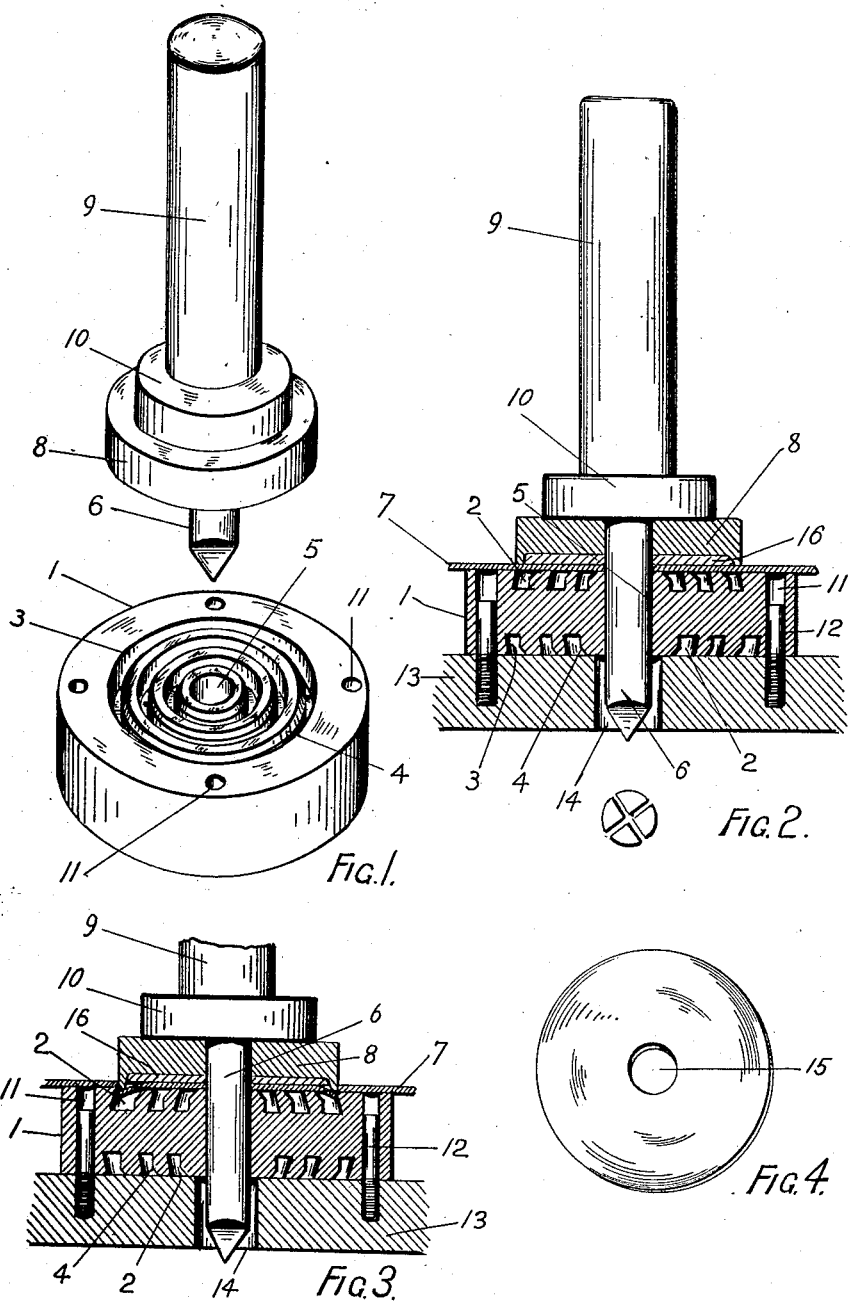
Joseph Jamieson
INVENTOR
By Otto Munk
his ATTY.

July 21, 1931.  J. JAMIESON  1,815,736
APPARATUS FOR CUTTING METAL AND OTHER MATERIALS
Filed July 18, 1928  2 Sheets-Sheet 2

Joseph Jamieson
INVENTOR his ATTY.

Patented July 21, 1931

1,815,736

UNITED STATES PATENT OFFICE

JOSEPH JAMIESON, OF BALMAIN, NEAR SYDNEY, NEW SOUTH WALES, AUSTRALIA

APPARATUS FOR CUTTING METAL AND OTHER MATERIALS

Application filed July 18, 1928, Serial No. 293,623, and in Australia September 16, 1927.

This invention relates to apparatus adapted primarily for cutting metal though also adaptable for cutting thin leaves of wood, cardboard, or other materials.

Said apparatus comprises a mould, form, or die block of any design, material, or dimensions, with a work face or faces of any suitable pattern or patterns. Such mould, form, or die block may have associated therewith means whereby a piercer and a cutter can be elevated or lowered in relation to the die block and when lowered pressure may be applied to both the piercer and the cutter, or whereby a cutter can be elevated or lowered in relation to the die block and pressure applied to the cutter. When pressure is so applied the piercer can enter the material to be cut and also a central guide hole in the die block and the cutter will thus be enabled to cut the said material to desired shape. The foot of the piercer is shaped or sharpened to enable it to penetrate the material which is being operated upon. If required the material may first be provided with a central opening and then placed on the die block when upon pressure being applied to the piercer and the cutter, the piercer will pass through said opening into the guide hole in the die block and the material will be cut to desired shape by the cutter. When, however, the piercer is not provided the die block need not be provided with a central opening.

Instead of applying pressure to the piercer and the cutter, or to the cutter only, the head of the piercer or the cutter or an associated element thereof may be struck by a hammer or other suitable instrument after the material to be cut and the piercer and the cutter or the latter only have been assembled in proper relation to each other, whereby the material operated on may be pierced and cut to shape, or if pierced, may be cut to required shape, or if not pierced may be cut to shape.

In every case the material is cut to the shape or form of the pattern on the mould, form, or die block. As the operative face of the cutter is hollow, in certain cases it may be necessary to fit such face with rubber or other suitable means whereby blanks cut from material operated upon may be disconnected from the cutters when the cutting operation of the material has been completed.

Figure 5:
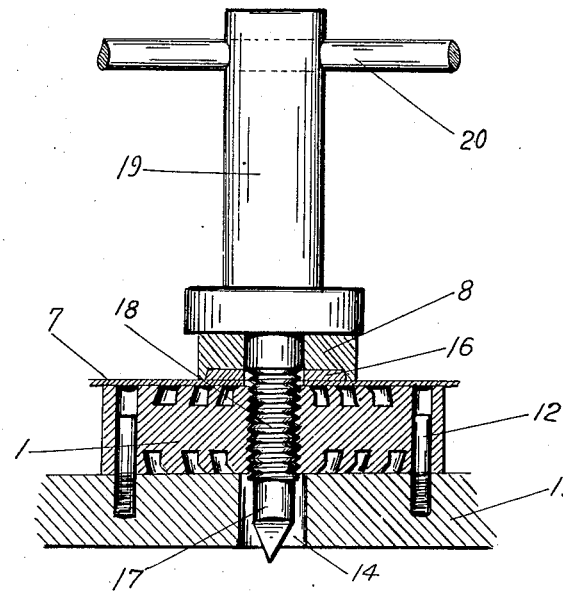

Referring to the accompanying drawings, Fig. 1 is a perspective view of one form of the apparatus in which a die block is shown provided with central guide hole for a piercer and with operative cutter faces, the piercer with cutter and die block being disassociated from each other; Fig. 2 elevational view partly in section corresponding with Fig. 1 and showing the piercer with cutter and die block assembled for cutting operation; Fig. 3 detail view illustrating cutting operation of a metal blank with apparatus shown in Figs. 1 and 2; Fig. 4 perspective view of article cut to required form; Fig. 5 view of alternative form of apparatus to that shown in Figs. 1 to 3; and Fig. 6 elevational view partly in section of cutting apparatus in which piercing means are not used.

With reference to Figs. 1 to 4, the metal mould, form, or die block 1 may be of any suitable type; in such Figures it is shown of circular formation with a series of concentric grooves 2 in the upper and lower faces thereof. Such grooves may be provided in one face only of the block 1; if provided in both faces, the block 1 may be reversed for special cutting operations on blanks. The grooves 2 have inclined outer walls 3 and chamfered inner walls 4.

Centrally of the block 1 is a guide through opening 5 for a piercer 6 whose forward end may be shaped to enable it to readily cut into the centre of a blank 7 which may be located on the head of the block 1 as required. The piercer 6 has suitably fitted thereto a cutter 8 and its upper portion 9 may be of larger diameter than its actual piercing portion, a collar 10 being provided between the portion 9 and the cutter 8.

In the block 1 there are a series of openings 11, adapted to receive centering screws 12 or screws securable to the support 13 which has a central opening 14 into which the piercer 6 may project in cutting operations on blanks 7. Such blanks when cut into articles by the apparatus are shown in Fig. 4; said articles have a central opening 15. Such opening 15 may be made by the piercer 6, or before cutting, the blanks 7 for the articles may have said opening 15 made therein.

To cut articles from the blanks 7 when the latter are assembled on the block 1, it is only necessary to strike the head of the portion 9 of the piercer 6 with a hammer or other suitable implement whereby the cutting faces of the cutter 8 will sever the blanks at the portions of the grooves 2 of the block 1 with which the said cutting faces coincide. A series of cutters 8 can be provided to fit the piercer 6 and whose cutting faces are respectively adapted to coincide with the grooves 2 of the block 1. The cutters 8 are recessed about their operative faces and such recessed portion thereof may carry a rubber or other suitable resilient packing disc 16 to enable cut articles from blanks to be disassociated from the cutters after the cutting operation of blanks 7 has been completed.

The alternative construction of apparatus shown in Fig. 5 is similar to that shown in Figs. 1 to 4, but the piercer 17 shown therein has a screw-threaded shank 18 which fits a tapped opening in the die block 1. The upper portion 19 of the piercer 17 is also fitted with a turning spindle 20. Cutting of blanks 7 with this form of apparatus is effected by turning the piercer 17 through the spindle 20 whereby the cutter 8 will operate on and cut a blank 7 to produce an article such as that shown in Fig. 4 with central opening 15.

Figure 6:
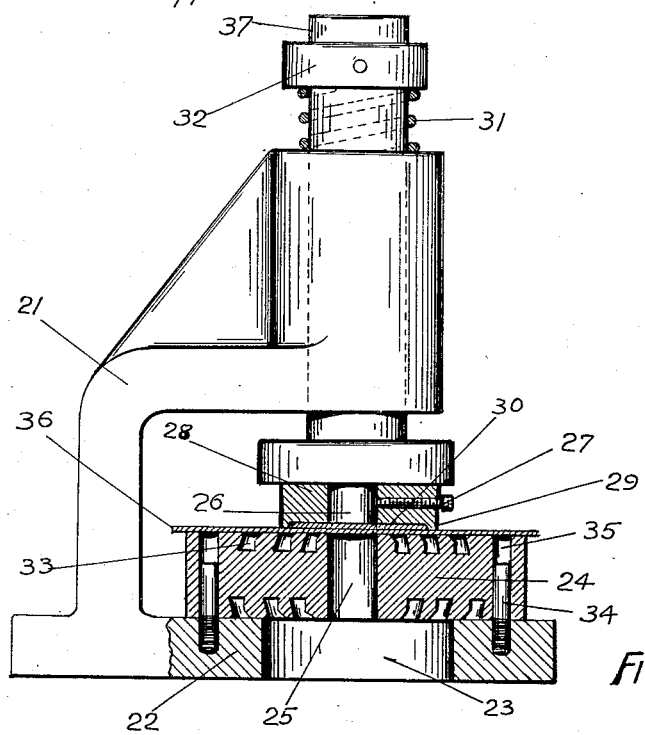

When the article to be produced is not to be furnished with a central opening 15, apparatus such as that shown in Fig. 6 may be utilized for cutting the blanks 36 to allow articles to be produced to required shape. Such apparatus may comprise a bracket 21 having a foot plate 22 in which may be a central opening 23. Such bracket 21 may be suitably affixed to a support. The die block 24 may have a central opening 25 or such opening may be omitted. The bracket 21 serves as a bearing for a spindle 26 which may have attached thereto, by a pinching screw or screws 27, the recessed cutter 28 with cutting faces 29 and carrying resilient disc 30. The upper portion 37 of the spindle 26 may be enlarged and it may carry a collar 32 against which may abut one end of the coil spring 31 which encircles such portion of the spindle 26, the other end of the said spring being adapted to abut portion of the bracket 21. The die block 24 may have a series of grooves 33 similar to those previously described and the foot plate 22 may have centering pins 34 adapted to enter openings 35 in the die block 24, or such pins may be substituted by screws adapted to be secured to the foot plate 22 and to the block 24.

Blanks 36 may be cut to required shape by striking the head of the portion 37 of the spindle 26 with a hammer or other suitable implement or by otherwise exerting pressure on the head of the portion 37 of the spindle 26, the spring 31 serving to return the spindle 26 to normal position, and the resilient disc 30 enabling cut articles to be disassociated from the cutter 28.

What I claim as my invention and desire to secure by Letters Patent is:—

Cutting apparatus comprising an alignable metal die having an opening centrally thereof and a series of concentric cutting grooves therein, each of said grooves forming a complete circle, the outer walls of each of said grooves being inclined and the inner walls thereof being chamfered, a piercer adapted to enter said opening in the die during cutting operations of blanks after the said piercer has passed through a blank, and a concentric cutter on said piercer adapted to cooperate with one of said grooves to cut a blank after passage of said piercer through the blank to be cut.

In testimony whereof I affix my signature.

JOSEPH JAMIESON.